United States Patent
Kwon

(10) Patent No.: US 9,242,173 B2
(45) Date of Patent: Jan. 26, 2016

(54) GAME SCRAPBOOK SYSTEM, GAME SCRAPBOOK METHOD, AND COMPUTER READABLE RECORDING MEDIUM RECORDING PROGRAM FOR IMPLEMENTING THE METHOD

(75) Inventor: Mi Jin Kwon, Seoul (KR)

(73) Assignee: NHN Entertainment Corporation, Seongnam-si (KR)

( * ) Notice: Subject to any disclaimer, the term of this patent is extended or adjusted under 35 U.S.C. 154(b) by 1464 days.

(21) Appl. No.: 11/908,722

(22) PCT Filed: Mar. 17, 2006

(86) PCT No.: PCT/KR2006/000995
§ 371 (c)(1),
(2), (4) Date: Sep. 14, 2007

(87) PCT Pub. No.: WO2006/098606
PCT Pub. Date: Sep. 21, 2006

(65) Prior Publication Data
US 2008/0113812 A1    May 15, 2008

(30) Foreign Application Priority Data

Mar. 17, 2005 (KR) .......................... 10-2005-0022427

(51) Int. Cl.
*A63F 13/30* (2014.01)
(52) U.S. Cl.
CPC ........... *A63F 13/12* (2013.01); *A63F 2300/203* (2013.01); *A63F 2300/407* (2013.01); *A63F 2300/554* (2013.01); *A63F 2300/5533* (2013.01)
(58) Field of Classification Search
CPC .............. A63F 13/12; A63F 2300/407; A63F 2300/554; A63F 2300/634; H04N 21/4781; H04N 21/6125

USPC ....................... 709/203, 205, 219; 463/42, 43
See application file for complete search history.

(56) References Cited

U.S. PATENT DOCUMENTS

| | | | | |
|---|---|---|---|---|
| 4,342,454 A | * | 8/1982 | Baer | A63F 13/10 345/672 |
| 5,577,960 A | * | 11/1996 | Sasaki | G06T 15/04 345/428 |
| 5,695,401 A | * | 12/1997 | Lowe et al. | A63F 9/24 463/31 |
| 5,772,509 A | * | 6/1998 | Weiss | G07F 17/3267 463/16 |
| 5,779,548 A | * | 7/1998 | Asai et al. | A63F 13/10 463/1 |
| 6,280,323 B1 | * | 8/2001 | Yamazaki et al. | A63F 13/005 463/31 |

(Continued)

FOREIGN PATENT DOCUMENTS

| | | | | |
|---|---|---|---|---|
| EP | | 983782 A2 | * 3/2000 | A63F 13/10 |
| JP | | 2002-78956 | 3/2002 | |

(Continued)

*Primary Examiner* — Backhean Tiv
(74) *Attorney, Agent, or Firm* — H.C. Park & Associates, PLC

(57) ABSTRACT

A game scrap system associated with a game progress includes: a data table setting setup information by recording at least one game environment associated with a generation of a predetermined event signal; an event signal generation unit generating the event signal when a game environment according to a game progress corresponds to at least a portion of the setup information; an image capturing unit, in response to the event signal, capturing a game image to generate game image information; and an image transmission unit transmitting the generated game image information to a remote location in a network using a network address.

18 Claims, 7 Drawing Sheets

(56) References Cited

U.S. PATENT DOCUMENTS

| | | | | |
|---|---|---|---|---|
| 6,325,718 B1* | 12/2001 | Nishiumi et al. | ....... | A63F 13/02 463/36 |
| 6,336,865 B1* | 1/2002 | Kinjo | ................. | G11B 27/105 273/148 B |
| 6,338,680 B1* | 1/2002 | Connors | ................. | A63F 13/02 273/148 B |
| 6,582,299 B1* | 6/2003 | Matsuyama et al. | .... | A63F 13/10 463/2 |
| 6,602,132 B2* | 8/2003 | Kozawa et al. | ......... | A63F 13/10 463/7 |
| 6,633,308 B1* | 10/2003 | Ono et al. | ...................... | 715/723 |
| 6,688,980 B2* | 2/2004 | Hirai | ...................... | A63F 13/06 345/473 |
| 6,699,127 B1* | 3/2004 | Lobb | ...................... | A63F 13/10 345/418 |
| 6,724,826 B1* | 4/2004 | Varian | ................... | H40N 19/80 375/240.29 |
| 6,811,490 B2* | 11/2004 | Rubin | ................... | A63F 13/10 463/43 |
| 6,811,492 B1* | 11/2004 | Arakawa | ................. | A63F 13/02 273/148 B |
| 6,894,686 B2* | 5/2005 | Stamper | ................. | A63F 13/02 345/419 |
| 6,921,336 B1* | 7/2005 | Best | ........................ | A63F 13/10 463/32 |
| 6,970,177 B2* | 11/2005 | Yamada et al. | ................ | 345/629 |
| 7,023,477 B2* | 4/2006 | Malloy Desormeaux et al. | .......................... | 348/231.1 |
| 7,214,133 B2* | 5/2007 | Jen | ........................ | A63F 13/10 434/69 |
| 7,326,117 B1* | 2/2008 | Best | ........................ | A63F 13/10 463/32 |
| 7,548,565 B2* | 6/2009 | Sull | ................... | G06F 17/30796 370/503 |
| 7,576,752 B1* | 8/2009 | Benson | ................. | G06F 3/1415 345/619 |
| 7,627,139 B2* | 12/2009 | Marks | ...................... | A63F 13/00 345/156 |
| 7,760,248 B2* | 7/2010 | Marks | ...................... | A63F 13/04 348/14.09 |
| 7,830,399 B2* | 11/2010 | Benson | ................. | G06F 3/1415 345/619 |
| 7,837,561 B2* | 11/2010 | Bortnik | ................... | A63F 13/12 463/1 |
| 7,874,908 B2* | 1/2011 | Walker | ................... | G07F 17/32 273/153 R |
| 7,883,415 B2* | 2/2011 | Larsen | ................... | A63F 13/10 345/7 |
| 7,887,419 B2* | 2/2011 | Bortnik | ................... | A63F 13/10 463/40 |
| 7,892,092 B2* | 2/2011 | Matthews | ............... | G07F 17/32 463/16 |
| 7,914,381 B2* | 3/2011 | Blythe | ................... | A63F 13/12 370/352 |
| 2002/0087403 A1* | 7/2002 | Meyers et al. | ......... | G06Q 30/02 705/14.64 |
| 2002/0193156 A1* | 12/2002 | Nishimura | ............ | A63F 13/005 463/2 |
| 2003/0003988 A1* | 1/2003 | Walker et al. | .......... | G06Q 30/02 463/21 |
| 2003/0011610 A1* | 1/2003 | Kitsutaka | ............ | G06T 15/005 345/582 |
| 2003/0179213 A1* | 9/2003 | Liu | ...................... | G06K 9/4652 345/619 |
| 2003/0189581 A1* | 10/2003 | Nasoff | ................. | G06F 3/14 345/660 |
| 2004/0063479 A1* | 4/2004 | Kimura | ................. | A63F 13/10 463/4 |
| 2004/0130567 A1* | 7/2004 | Ekin | .................. | A63B 24/0003 715/723 |
| 2004/0219980 A1* | 11/2004 | Bassett et al. | ........... | A63F 13/10 463/33 |
| 2004/0224741 A1* | 11/2004 | Jen | .......................... | A63F 13/10 463/6 |
| 2005/0005308 A1* | 1/2005 | Logan et al. | ................... | 725/135 |
| 2005/0256845 A1* | 11/2005 | Jen | .................... | G06F 17/30575 |
| 2006/0098013 A1* | 5/2006 | Wong | ...................... | A63F 13/12 345/473 |
| 2006/0128471 A1* | 6/2006 | Willis | .................... | A63F 13/10 463/42 |
| 2006/0148571 A1* | 7/2006 | Hossack | .................. | A63F 13/10 463/43 |
| 2006/0234817 A1* | 10/2006 | Mockry | ........................ | 473/468 |
| 2006/0239471 A1* | 10/2006 | Mao | ........................ | H04R 1/406 381/92 |
| 2007/0015557 A1* | 1/2007 | Murakami | ........................ | 463/1 |
| 2007/0021199 A1* | 1/2007 | Ahdoot | ............. | A63B 24/0003 463/30 |
| 2007/0149287 A1* | 6/2007 | Kubota | ................. | A63F 13/12 463/42 |
| 2008/0015012 A1* | 1/2008 | Englman | ................. | G07F 17/3267 463/25 |
| 2008/0261702 A1* | 10/2008 | Rubin | ................... | A63F 13/10 463/43 |
| 2008/0274798 A1* | 11/2008 | Walker | .................... | G07F 17/32 463/25 |
| 2008/0274808 A1* | 11/2008 | Walker | .................... | G07F 17/32 463/31 |
| 2009/0062017 A1* | 3/2009 | Kelly | ...................... | H04L 67/38 463/42 |
| 2009/0238405 A1* | 9/2009 | Buznach | ................. | A63F 13/12 382/103 |
| 2010/0033427 A1* | 2/2010 | Marks | ...................... | A63F 13/02 345/156 |
| 2010/0166056 A1* | 7/2010 | Perlman | .................. | A63F 13/12 375/240.01 |
| 2010/0167809 A1* | 7/2010 | Perlman | .................. | A63F 13/12 463/24 |
| 2011/0018899 A1* | 1/2011 | Benson | ................. | G06F 3/1415 345/619 |
| 2011/0045912 A1* | 2/2011 | Bortnik | .................. | A63F 13/12 463/42 |
| 2011/0074669 A1* | 3/2011 | Marks | ..................... | A63F 13/06 345/156 |
| 2011/0107220 A1* | 5/2011 | Perlman | .................. | A63F 13/12 715/720 |

FOREIGN PATENT DOCUMENTS

| | | |
|---|---|---|
| JP | 2002-223409 | 8/2002 |
| JP | 2003-117239 | 4/2003 |
| JP | 2003-131862 | 5/2003 |
| JP | 2004-255214 | 9/2004 |
| KR | 10-2000-0016173 | 3/2000 |
| KR | 10-2004-0034992 | 4/2004 |
| KR | 10-2004-0077171 | 9/2004 |
| KR | 10-2005-0080090 | 8/2005 |

\* cited by examiner

<FILTERING>

GAME PROGRESS TIME

GENERATION OF EVENT SIGNAL
(GAME ENVIRONMENT: HOLE-IN-ONE)

<EDITING>

GAME IMAGE
INFORMATION

UNIT GAME IMAGE
INFORMATION
(SELECT CELLS II, III,
IV, VII, VIII & IX)

GAME SCRAPBOOK SYSTEM, GAME SCRAPBOOK METHOD, AND COMPUTER READABLE RECORDING MEDIUM RECORDING PROGRAM FOR IMPLEMENTING THE METHOD

CROSS-REFERENCE TO RELATED APPLICATIONS

This application is a U.S. National Phase Application of International Application PCT Application No. PCT/KR2006/000995, filed on Mar. 17, 2006, which claims the benefit of priority from Korean Patent Application No. 10-2005-0022427, filed on Mar. 17, 2005. The disclosures of International Application PCT Application No. PCT/KR2006/000995 and Korean Patent Application No. 10-2005-0022427 are incorporated herein by reference.

TECHNICAL FIELD

The present invention relates to a game scrapbook system and method which can set a game environment associated with a game image as setup information, and when a game environment according to a game progress corresponds to the set setup information, can capture a corresponding game image and transmit the same to a remote location in a network associated with a gamer.

BACKGROUND ART

As people desire to leave their precious memories using a photo, gamers also identify themselves with a game character and strongly desire to record a particular game image of their game play, with respect to most games that the gamers are absorbed with. However, a game service which can satisfy gamers' such desire has scarcely been developed.

To partially satisfy garners' such desire, some games includes a replay function. Accordingly, when the gamer wants, the entire game played by a gamer is replayed.

However, the replay function replays a game play of only a previous game in its entirety. Accordingly, when a gamer wants to find a particular game image, the gamer has an inconvenience of utilizing a fast forwarding/rewinding function.

Also, some Internet search services provide a searcher with a service of capturing and storing a retrieved webpage content according to a decision of the searcher and later replaying the stored webpage content according to the searcher's desire. However, such a capturing function of an Internet search service may be limitedly applicable to games. Unlike an Internet search service in which a screen rarely changes after providing a webpage content and thus, a searcher has plenty of time to give a command, a game is in constant progress and a game image is continuously changed. Accordingly, a game image to be recorded may be changed with a new game image at a point in time when a gamer gives an actual capturing command.

Accordingly, a new game scrapbook model which can pre-set a predetermined game environment, and when a game environment changing according to a game progress corresponds to the set game environment, can automatically capture and record a displayed game image is required. Also, a game scrapbook model which can more effectively maintain, replay and re-transmit a game image by automatically transmitting a captured game image to a particular location in a network that a gamer can easily access is required.

DISCLOSURE OF INVENTION

Technical Goals

The present invention is conceived to solve the aforementioned problems in the conventional art and thus, the present invention provides a game scrapbook system and method which can more effectively maintain and store a game image by capturing the game image while a game is in progress and automatically transmitting game image information to a web server that a gamer can easily access.

The present invention also provides a game scrapbook system and method which can accurately retrieve a game image to be recorded, even when a generation point in time of an event signal is not accurate, by maintaining game image information with respect to a captured game image under a predetermined condition, and selecting game image information which directly causes the event signal to be generated with the generation of the event signal associated with a transmission of a game, and thus, can maintain the retrieved game image.

The present invention also provides a game scrapbook system and method which can divide game image information for transmission to a web server according to properties of the game image information, and can also help the gamer to quickly retrieve the game image information when a gamer retrieves the game image information.

Technical Solutions

To achieve the above objectives, according to an aspect of the present invention, there is provided a game scrapbook system including: a data table setting setup information by recording at least one game environment associated with a generation of a predetermined event signal; an event signal generation unit generating the event signal when a game environment according to a game progress corresponds to at least a portion of the setup information; an image capturing unit, in response to the event signal, capturing a game image to generate game image information; and an image transmission unit transmitting the generated game image information to a remote location in a network using a network address.

According to another aspect of the present invention, there is provided a game scrapbook system including: an image database maintaining game image information associated with a game image according to a game progress; an image extraction unit extracting game image information from the image database, when a predetermined event signal is generated; an image editor filtering or editing the extracted game image information to generate predetermined unit game image information; and an image transmission unit transmitting the generated unit game image information to a remote location in a network using a predetermined network address.

BEST MODE FOR CARRYING OUT THE INVENTION

Hereinafter, a game scrapbook system and method associated with a game progress according to the present invention will be described with reference to the accompanying drawings.

"Game image information" or "unit game image information" used throughout the present specification may indicate static image data or animated image data which is generated by capturing a game image displayed in a display in association with a predetermined game. Namely, "game image information" or "unit game image information" is information as a result of capturing a game image which may be recorded while a game in progress. As an example, "game image information" or "unit game image information" may include information about a very meaningful game image (scene) to a gamer in a game, such as a scene in which a character makes a hole-in-one in a golf game, a scene in which an enemy character is hit in a shooting game, a scene in which a character shows a deathblow in a war game, etc. In particular, "unit game image information" may indicate image data which enables only a game image for recording to be selectively extracted from "game image information" by filtering or editing the "game image information". In this instance, the "game image information" may include an increasing number of game images while a game in progress. In the present specification, for convenience of description, image data which is generated at a point in time when a game image is captured is defined as "game image information". Also, image data which is generated by editing the generated "game image information" is defined as "unit game image information".

Figure 1:
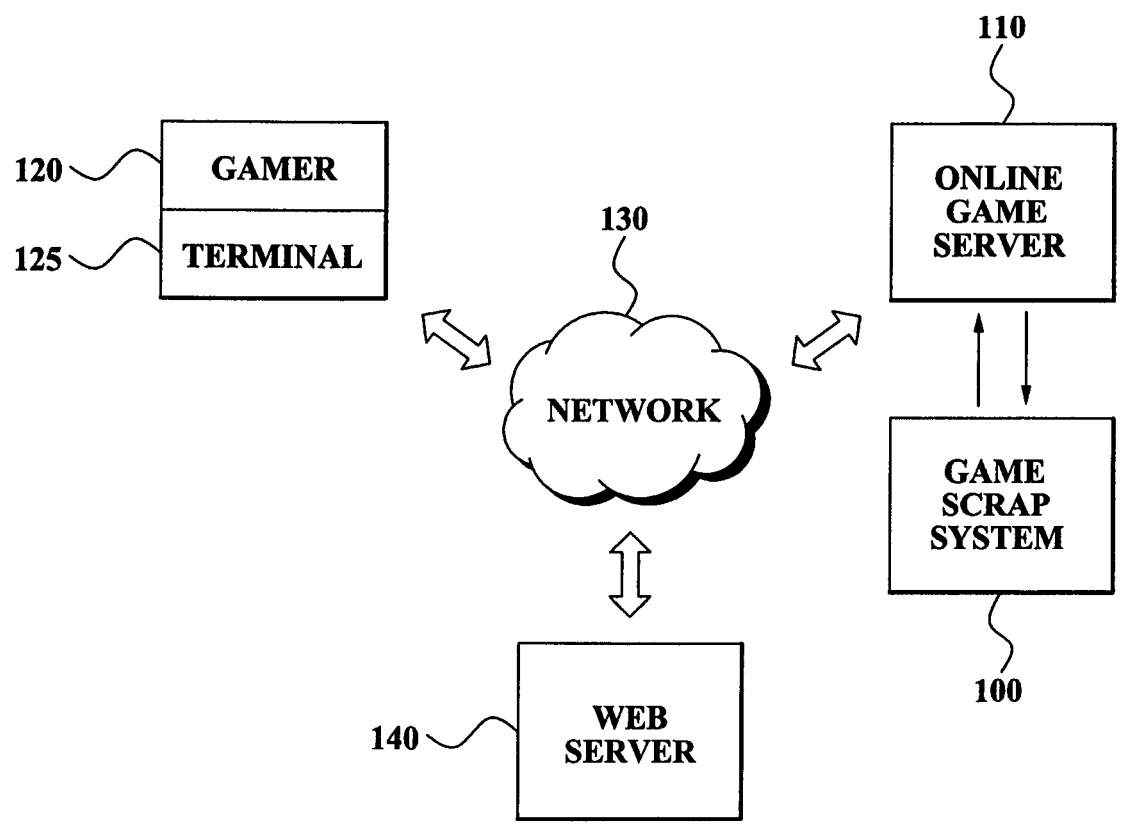
FIG. 1 is a diagram illustrating a network configuration of a game scrapbook system according to the present invention.

FIG. 1 is a diagram illustrating a network configuration of a game scrapbook system according to the present invention.

A game scrapbook system 100 generates a predetermined event signal when a game environment according to a game progress corresponds to pre-set setup information, and in response to the generated event signal, captures a game image and generates game image information. Also, the game scrapbook system 100 may maintain the game image information, which is generated by capturing the game image, within a certain size and in response to the generated event signal, edit the game image information and generate unit game image information. In particular, the game scrapbook system 100 according to the present embodiment may maintain a game image that has some value as an information in a web server 140 (e.g. a blog, a homepage, a community, etc.) associated with a gamer 120, by transmitting the generated "game image information" or "unit game image information" to the web server 140 using a predetermined network address.

In the present embodiment, the game scrapbook system 100 is embodied in an online based game, which is for convenience of description. However, the present invention is not limited thereto and it will be apparent to those skilled in the related art that the present invention is applicable to any type of game such as a personal computer based game, a video console based game, etc.

An online game server 110 is connected to a terminal 125 of the gamer 120 and a communication network 130 and functions to provide the gamer 120 with an online game service. Namely, the online game server 110 may indicate a Multiple User Dialogue (MUD) game service server, a Multiple User Graphic (MUG) game service server, etc. When the gamer 120 who has installed a game related program in his/her terminal 125 accesses the online game server 110, the online game server 110 may transmit predetermined game progress data or a game patch to the terminal 125. A game service in the online game server 110 may be provided to the user 120 through a game program which is activated by said game progress data or the game patch. The gamer 120 may control a character by using the terminal 125 to thereby activate the game related program and thus, play a game.

The gamer 120 may be an Internet user who has the terminal 125 to access the network 130, receive the game progress data or the game patch necessary for the game from the online game server 110 and also receive a predetermined game service. Also, the gamer 120 may automatically store a game image (static image data, animated image data) which causes a significant change in a game in progress, in the web server 140 associated with the gamer 120, and as necessary, receive a replay service of the present invention.

The terminal 125 maintains a connection state with the online game server 110 via the network 130, such as the Internet and a telephone line, displays an online game and thus, provides the gamer 120 with a game service. Namely, the terminal 125 includes a calculation ability by installing a predetermined memory and a predetermined microprocessor, such as a handheld computer, a personal digital assistant (PDA), a mobile phone, and a smart phone.

When a significant change occurs in a game environment by, e.g. a motion/movement of a character and a clearing of a mission of a game, the game scrapbook system 100 automatically captures a related game image and stores the captured game image in the web server 140 designated by the gamer 120. Accordingly, the game scrapbook system 100 according to the present invention may capture and maintain a game image that the gamer 120 desires to record, at a particular point in time in a game in progress and without dropping. Hereinafter, a game scrapbook system 200 according to the present invention will be described with reference to FIG. 2.

Figure 2:
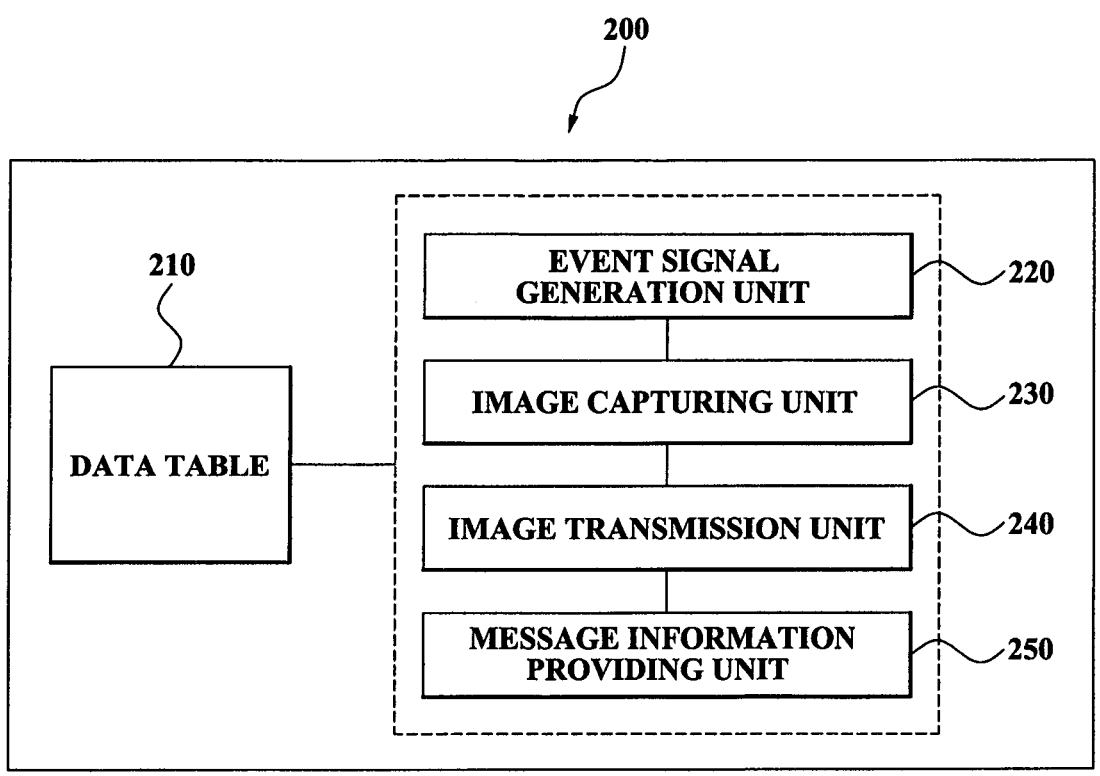
FIG. 2 is a configuration diagram illustrating a game scrapbook system according to an embodiment of the present invention.

FIG. 2 is a configuration diagram illustrating the game scrapbook system 200 according to an embodiment of the present invention.

Capturing a game image when a game environment according to a game progress corresponds to pre-set setup information will be described with reference to FIG. 2.

The game scrapbook system 200 includes a data table 210, an event signal generation unit 220, an image capturing unit 230, an image transmission unit 240 and a message information providing unit 250.

The data table 210 generates setup information by inputting at least one game environment associated with a generation of a predetermined event signal.

In this instance, the event signal may indicate a signal associated with a command of capturing a game image displayed in a game screen (display) at a point in time when the event signal is generated.

Also, the setup information is used to define a game environment for generating the event signal. The setup information may be generated by inputting a predetermined game environment into the data table 210 according to a decision of an operator of the present system or the gamer 120.

As an example, the data table 210 is provided to the operator of the present system or the gamer 120 at an initial state of a game. The operator or the gamer 120 may pre-input a predetermined game environment according to a game progress and generate setup information. The game environment associated with the generation of setup information may be inputted in various types according to arbitrary decisions of the operator or the gamer 120. As an example, when a game genre is a golf game, the operator or the gamer 120 may input a hole-in-one/power shot as a game environment. Also, in the case of a shooting game, sniping/hitting an enemy may be inputted. Also, in the case of a war game, a deathblow may be inputted.

The event signal generation unit 220 generates the event signal when the game environment of the game progress corresponds to at least a portion of the setup information. Namely, when the game environment according to the game progress is identical to the game environment set as the setup information, the event signal generation unit 220 generates the event signal associated with the capturing of the game screen. A generation point in time of the event signal by the event signal generation unit 220 may be different according to a type of game image information to be generated in the image capturing unit 230, which will be described later.

As an example, when the game image information is animated image data, the event signal may be generated just before the game environment changes into the set game environment. Also, when the game image information is static image data, the event signal may be generated at the same time as when the setup information changes into the set game environment.

When the event signal is generated, the image capturing unit 230 functions to generate the game image information associated with the game image displayed on the display of the terminal 125. Namely, the image capturing unit 230 functions to record the game image at a generation point of time of the event signal as the game image information. In this instance, a capturing method may be different according to a kind of game image information to be captured.

As an example, with the assumption that a serviced game is a golf game and a hole-in-one is set as setup information, when generating game image information as animated image data, the image capturing unit 230 may capture a game image corresponding to a predetermined period around a point in time when the hole-in-one is substantially made, and generate game image information as moving image data. In this instance, a point in time to start capturing the game image may be determined as a point in time when inclusion of the game image associated with the hole-in-one in the game image information is capable, according to the generation of the event signal. On the other hand, when generating game image information as static image data, the image capturing unit 230 may capture a corresponding game image in conjunction with an event signal which is generated at a point in time when the hole-in-one is made. In this instance, an error may occur between a point in time when a hole-in-one is substantially made and a captured point in time of a game image. To compensate for this, the image capturing unit 230 may perform consecutive capturing at a predetermined time interval after the event signal is generated. Also, the image capturing unit 230 may select game image information which is most temporally adjacent to the hole-in-one.

The image transmission unit 240 functions to transmit the generated game image information to a remote location in a network using a network address. Also, the image transmission unit 240 functions to maintain the generated game image information in the remote location, e.g. the web server 140, that the gamer 120 desires to transmit. In this instance, a network address may indicate information which can identify the web server 140 associated with the gamer 120, such as a blog, a homepage and a community. As an example, the network address may be information which is received from the gamer 120 when making a contract about providing a game service, and recorded in a predetermined gamer database (not shown). Namely, the image transmission unit 240 may transmit the game image information to the web server 140, which is identified by the network address inputted from the gamer 120, so that the gamer 120 may replay, edit and re-transmit the game image information. The image transmission unit 240 according to another embodiment of the present invention may control a predetermined control unit (not shown) to provide the gamer 120 with a predetermined input window for inputting a network address, just before transmitting game image information. Also, the image transmission unit 240 may transmit game image information to a network address inputted in the input window. In the present embodiment, it has been described that a network address identifies the web server 140. However, the present invention is not limited thereto. In addition, the network address may identify any type of service support devices (servers) managing personal information, such as an e-mail address or a mobile phone number.

In particular, the image transmission unit 240 may control a data storage unit (not shown) to categorize and systematically manage the game image information transmitted to the web server 140 according to predetermined properties thereof. In this instance, the data storage unit may be included in the web server 140. Also, the data storage unit may indicate a device which can maintain data inputted or embedded in the web server 140, in a particular storage location. Also, the data storage unit functions to categorize and store game image information inputted from the image transmission unit 240 according to predetermined properties (categories). In this instance, the properties may be associated with a game name or a game genre of a game that has generated the game image information. The data storage unit categorizes the inputted game image information according to the game name or the game genre. In this instance, the data storage unit may arrange at least one game image information corresponding to an identical property according to a chronological order (transmission order) that the at least one game image was inputted into the web server 140. Through this, the data storage unit may help the gamer 120 to more quickly retrieve the game image information.

As an example, when the game image information that the image transmission unit 240 transmits to the gamer's 120 blog is associated with a hole-in-one in a golf game, the data storage unit may store the game image information in a blog in association with an item (folder, category), e.g. a game name of a corresponding golf game 'you are the king of golf'. After this, game image information associated with 'you are the king of golf' which is inputted into the blog may be stored in a time order in association with the item 'you are the king of golf'. Accordingly, the image transmission unit 240 may accumulate recordings of game images which were captured at predetermined previous points in time with respect to the golf game 'you are the king of golf'. Also, the image transmission unit 240 may enable the gamer 120 to easily retrieve a game image of a previous game that the gamer 120 has played.

The message information providing unit 250 functions to provide the gamer 120 associated with the game with guide information associated with transmission of the game image information. Namely, the message information providing unit 250 functions to notify the gamer 120 that static image data or animated image data generated by capturing a game image was transmitted to the web server 140 associated with the gamer 120. A point in time when the guide information is provided for the gamer 120 may be arbitrarily determined by an operator of the present system considering a system environment. As an example, the point in time may be determined after a game is terminated (after the gamer 120 generates a game termination signal), so as to not disturb a game in progress. Guide information may include a time when game image information is captured, a transmitted network address, link information on the network address, etc. When the gamer 120 clicks and selects the link information, the gamer 120 may access a corresponding network address.

As described above, according to the present invention, a game image may be easily maintained and stored by capturing a predetermined game image from a game in progress, and automatically transmitting the captured game image to the web server 140 that the gamer 120 can easily access.

Hereinafter, an example of capturing a game image and transmitting the same to a particular network address in a game scrapbook system according to the present invention will be described with reference to FIG. 3.

Figure 3:
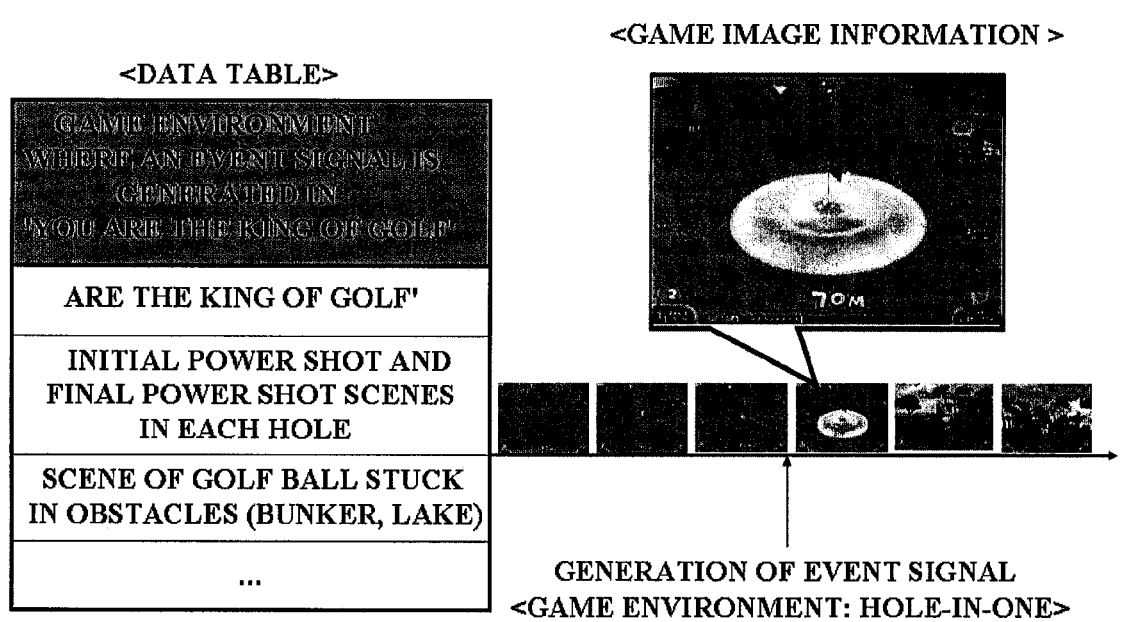
FIG. 3 is a diagram illustrating an example of generation and transmission of game image information according to the present invention.

FIG. 3 is a diagram illustrating an example of generation and transmission of game image information according to the present invention.

In FIG. 3, the data table 210 illustrates various game environments which can be set as setup information in the golf game 'you are the king of golf'. Referring to FIG. 3, 'hole-in-one' is set as setup information. When the set 'hole-in-one' is made according to a game progress, the event signal generation unit 220 may generate an event signal for capturing a game image. Also, in interoperation with generation of the event signal, the image capturing unit 230 captures a game image at a point in time when the event signal is generated and generates game image information as shown in FIG. 3. After this, the image transmission unit 240 transmits the generated game image information to the web server 140 of a predetermined network address. Accordingly, the image transmission unit 240 pre-sets predetermined scenes (game images) associated with a game in progress. When a game environment according to a real game in progress corresponds to the set setup information, the image transmission unit 240 may automatically capture and transmit a displayed game image. Accordingly, the game image that the gamer 120 replayed may be easily backed up.

As another embodiment of the present invention, automatically capturing a game image within a certain size and storing the same as game image information, and when an event signal is generated, generating game image information to be actually transmitted through filtering or editing will be described.

Figure 4:
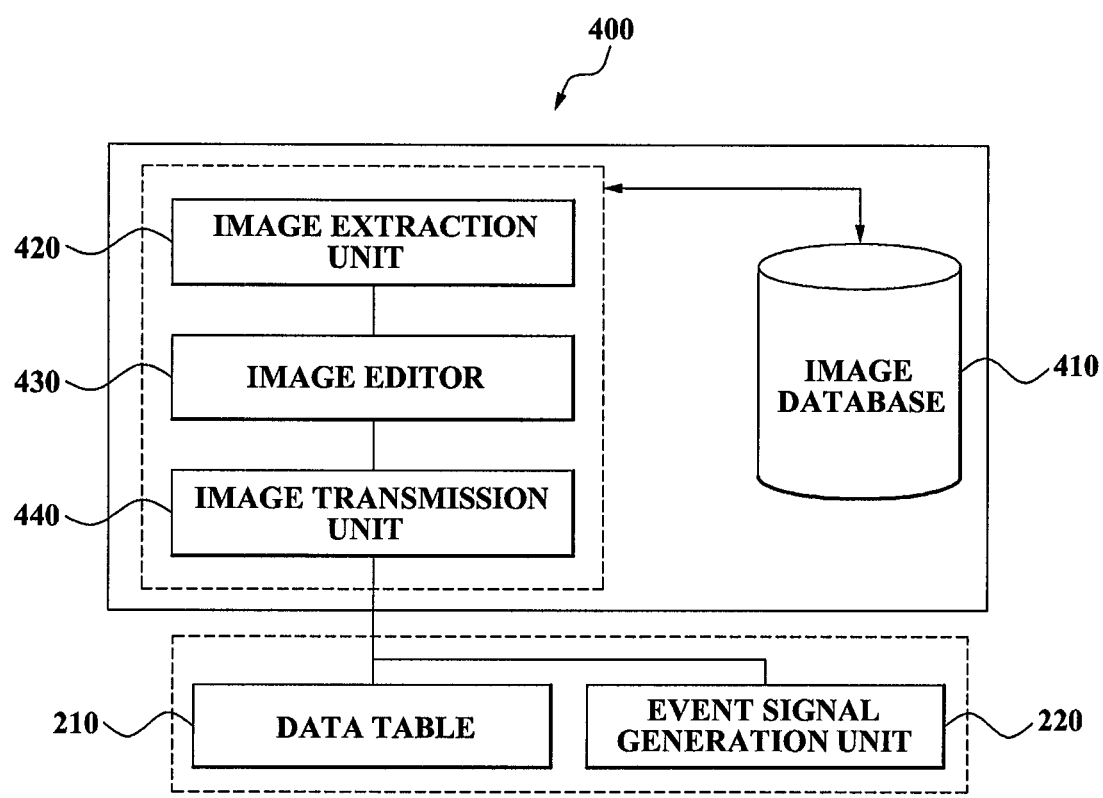
FIG. 4 is a diagram illustrating a configuration of a game scrapbook system according to another embodiment of the present invention.

FIG. 4 is a diagram illustrating a configuration of a game scrapbook system according to another embodiment of the present invention.

A game scrapbook system 400 according to the present embodiment includes an image database 410, an image extraction unit 420, an image editor 430 and an image transmission unit 440.

The image database 410 functions to maintain game image information which is generated by capturing a game image displayed in a display of the terminal 125 according to a game progress. Namely, the image database 410 functions to store the game image information which is generated by the image capturing unit 230 within a predetermined size (maximum capacity). In this instance, the image capturing unit 230 may continuously capture game images and provide the generated game image information to the image database 410. Also, when the image database 410 stores game image information exceeding the predetermined size, i.e. the maximum capacity, the image database 410 may update the earliest inputted game image information with game image information to be additionally inputted, based on a first-in first-out (FIFO) method. In the image database 410, the maximum capacity may be different according to a standard of storing game image information. As an example, the image database 410 may store game image information, based on a game progress time, a total capacity for maintaining information and a game stage.

As an example, when the image database 410 maintains the game image information based on a game progress time (5 minutes), the image database 410 maintains the game image information which is generated by capturing the game images corresponding to an initial 5 minutes via the image capturing unit 230. Also, with respect to the game image information which is generated after the initial 5 minutes, the image database 410 may delete the game image information which has been maintained for the longest time, from previously maintained game image information, and maintain additional game image information in a marginal space. Accordingly, the image database 410 may maintain the game image information associated with the game images embodied for a maximum 5 minutes, e.g. play time '00:00.about.05:00', and '01:30.about.06:30'. In this instance, the maximum capacity is determined according to an accumulated total size of the game image information with respect to the captured game images for the set game progress time (e.g. 5 minutes).

Also, when the game image information is maintained based on the total amount of information, the maximum capacity may be determined by an accumulated total size of the game image information that the image database 210 can maintain in one process.

Also, when the game image information is maintained based on a game stage, the maximum capacity may be determined by an accumulated total size of the game image information which is generated while playing the game in a particular place or until a particular mission is cleared (mission completion).

When a predetermined event signal is generated, the image extraction unit 420 functions to extract game image information from the image database 410. Namely, the image extraction unit 420 functions to extract game image information for transmission from the image database 410. Also, the image extraction unit 420 may extract all game image information which is maintained in the image database 410. As described above, an event signal may be generated when pre-set set setup information corresponds to a game environment according to a game progress. For this, the present embodiment may further include the data table 210 recording setup information and the event signal generation unit 220 generating the event signal. The data table 210 and the event signal generation unit 220 have been described and a related description related thereto will be omitted herein.

The event signal generation unit 220 may generate the event signal without regard to the game environment according to setup information, in response to a request for generating the event signal from the gamer 120. Namely, the event signal generation unit 220 generates the event signal with respect to a particular game image while the game is in progress according to spontaneous decisions of the gamer 120. Through this, a game image which is not pre-set as setup information but the gamer 120 desires to record may be flexibly maintained.

The image editor 430 edits or filters the extracted game image information into predetermined unit game image information. Namely, the image editor 430 functions to select the game image information desired to be stored in the web server

140, from the game image information having a wider play time range and to be extracted from the image database 410.

In this instance, filtering may be defined as dividing extracted game image information into unit game image information of a predetermined time interval and extracting a predetermined number of the unit game image information which is temporally adjacent to a point in time when the event signal is generated. Namely, filtering is a process of selecting game image information within a predetermined time range around a point in time when the event signal is generated. As an example, when game image information extracted from the image database 410 is static image data, individual game image information may be defined as unit game image information and a predetermined number of unit game image information may be selected based on around the generation point in time of the event signal. Also, when game image information is animated image data, divided individual game image information may be defined as unit game image information based on a predetermined period. Unit game image information may be selected from a predetermined time span around the generation point in time of the event signal.

Also, editing may be defined as segmenting the extracted game image information into at least one cell and extracting a predetermined number of cells which are adjacent to a predetermined object. Namely, editing segments selected unit game image information for each area size, and selects a predetermined number of cells which include an object to be recorded or are adjacent to the object. In this instance, the object is a character or an element associated with a game in progress. As an example, the object may be a player character which is controlled by the gamer 120, a golf hole, a bunker, a pond, etc., which is displayed in a game image.

The image editor 430 may select game images as unit game image information without dropping, through such filtering or editing. Also, the image editor 430 limits a game image included in the unit game image information, to be around an object actually recorded. Through this, the size of the unit game image information may not be unnecessarily increased.

Also, in this case, the image editor 430 may edit or compress the game image information to maximize capacity of the image database 410.

Figure 5:
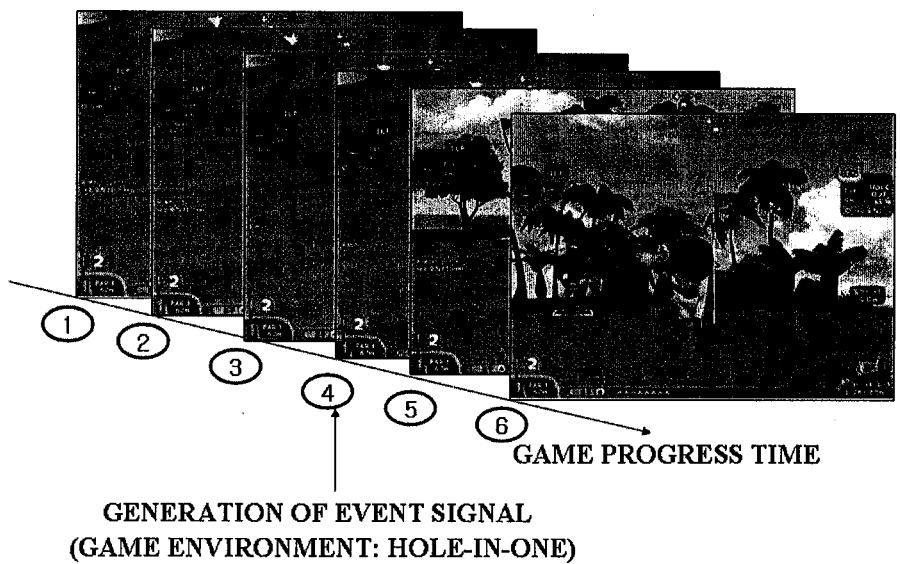
FIG. 5 is a diagram illustrating selecting of unit game image information according to filtering or editing of the present invention.
Figure 5:
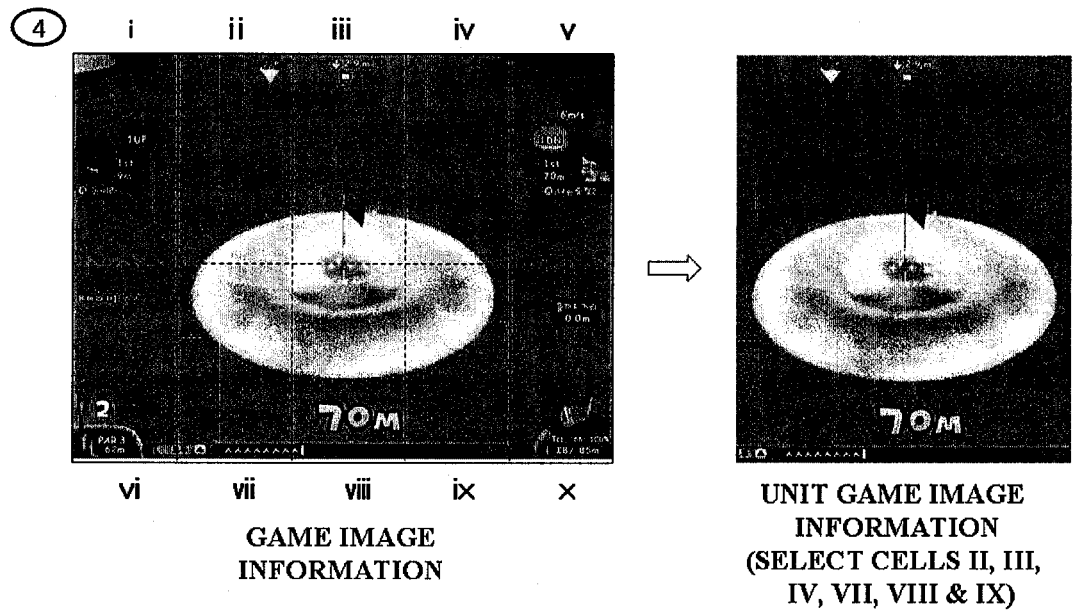

FIG. 5 is a diagram illustrating selecting of unit game image information according to filtering or editing of the present invention.

In FIG. 5, game image information maintained in the image database 210 is limited to animated image data, which is for convenience of description.

The image editor 430 divides game image information extracted from the image database 210 into a plurality of unit game image information based on a predetermined unit of game progress time. After this, as a game environment corresponds to setup information 'hole-in-one', the image editor 430 may extract unit game image information of a time which is adjacent to a generation point in time of an event signal. As an example, FIG. 4 illustrates extracting unit game image information of {circle around (4)} which is most adjacent to a generated event signal, using filtering.

Also, the image editor 430 segments extracted unit game image information into a predetermined number of cells and selects a predetermined number of cells which are adjacent to a target object to be recorded. Through this, the image editor 430 includes only a game image which is necessary for the unit game image information. In FIG. 4, the game image information of {circle around (4)} extracted by filtering is segmented into eight cells and only six cells, ii, iii, iv, vii, viii and ix, which are adjacent to an object 'hole cup' are saved. Accordingly, superfluous game images are not included in the unit game image information.

The image transmission unit 440 functions to transmit the unit game image information to a remote location in a network using a predetermined network address. In the above-described embodiment, the image transmission unit 240 functions to transmit edited unit game image information by filtering or editing, which is similar to transmitting generated game image information.

Also, according to another embodiment, the image editor 430 may arrange the edited at least one unit game image information according to a selected form and provides the same to the gamer 120, before transmitting the unit game image information. Accordingly, the image transmission unit 440 may transmit a predetermined number of the unit game image information selected by the gamer 120 to the gamer 120 using the network address. According to the present embodiment, the selected filtered or edited unit game image information is not unconditionally transmitted to the web server 140. Namely, only particular unit game image information may be transmitted according to an active selection of the gamer 120 considering the edited state.

As described above, according to the present invention, only information which is necessary for a game image maintained in a web server may be included by maintaining a game image corresponding to a certain period and extracting a game image at a particular point in time when an event signal is generated. Accordingly, a game image may be effectively transmitted and information also may be effectively maintained.

Hereinafter, operation flow of the game scrapbook system 200 constructed as above according to the present invention will be described in detail.

Figure 6:
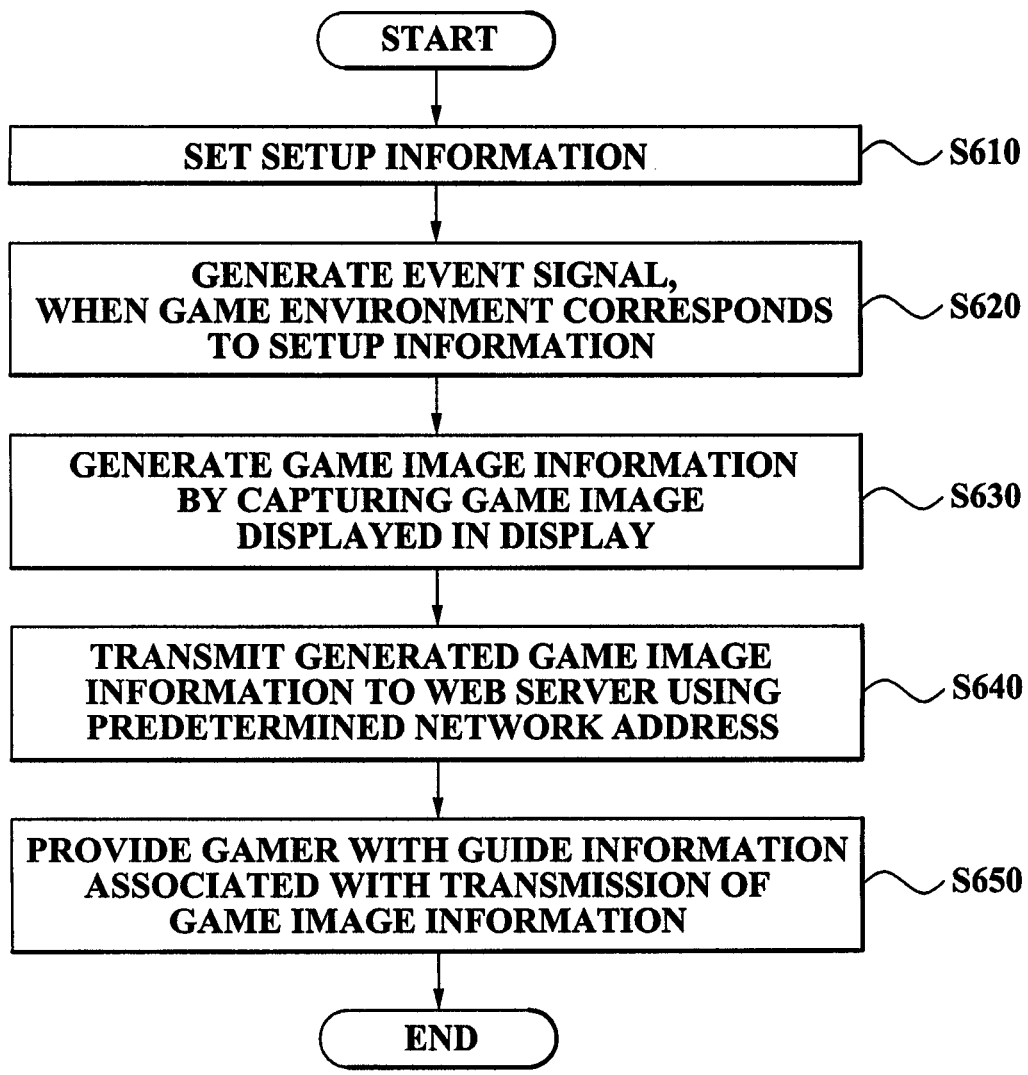
FIG. 6 is a flowchart illustrating a game scrapbook method according to an embodiment of the present invention.

FIG. 6 is a flowchart illustrating a game scrapbook method according to an embodiment of the present invention. The game scrapbook method according to the present embodiment may be performed by the game scrapbook system 200.

In step S610, the game scrapbook system 200 sets setup information by recording at least one game environment associated with a generation of a predetermined event signal. This step S610 is a process of pre-setting a game environment embodying a game image and thereby, enabling a related game image to be automatically captured in a screen capturing process. Such setup information is set by the operator or the gamer 120 inputting an arbitrary game environment into the data table 210. As an example, the setup information may include a game environment such as 'hole-in-one', 'power shot', etc, in a golf game (see FIG. 3).

In step S620, the game scrapbook system 200 generates an event signal when a game environment according to a game progress corresponds to at least a portion of the setup information. This step S620 is a process of generating an event signal for capturing a game image as a game environment corresponding to setup information is formed. In particular, in step S620, the game scrapbook system 200 may identify that a game environment according to a game progress changes into a game environment associated with the pre-set setup information, and also adjust a generation point in time of an event signal so that a game image to be substantially captured may be optimally captured.

In step S630, when the event signal is generated, the game scrapbook system 200 generates game image information associated with a game image displayed in a display of the terminal 125. This step S630 is a process of generating the game image information by capturing a game image associated with setup information. As an example, in step S630, the game scrapbook system 200 may generate the game image information of static image data or animated image data.

In step S640, the game scrapbook system 200 transmits the generated game image information to a remote location in a network using a network address. This step S640 is a process of recording the captured game image information in the web server 140 of the network address designated by the gamer 120. In particular, in step S640, the game scrapbook system 200 may control a predetermined data storage unit to divide the transmitted game image information according to a predetermined property (game name, game genre, etc.) in the web server 140, e.g. a blog, a homepage, and a community. Accordingly, when the gamer 120 retrieves the game image information from the web server, the gamer 120 may more quickly and easily retrieve the game image information.

In step S650, the game scrapbook system 200 provides the gamer 120 with guide information associated with the transmission of the game image information. This step S650 is a process of notifying the gamer 120 that the game image information has been transmitted immediately after the transmission of the game image information or the generation of the game termination signal. In step S650, information about the network address or a number of the game image information in association with transmission may be provided to the gamer 120.

As described above, according to the present invention, the game image may be automatically recorded by pre-setting a predetermined game environment and forming a corresponding game environment according to a game progress.

Hereinafter, maintaining a game image within a certain size and extracting an optimal game image when an event signal associated with transmission of the game image is generated according to another embodiment of the present invention will be described.

Figure 7:
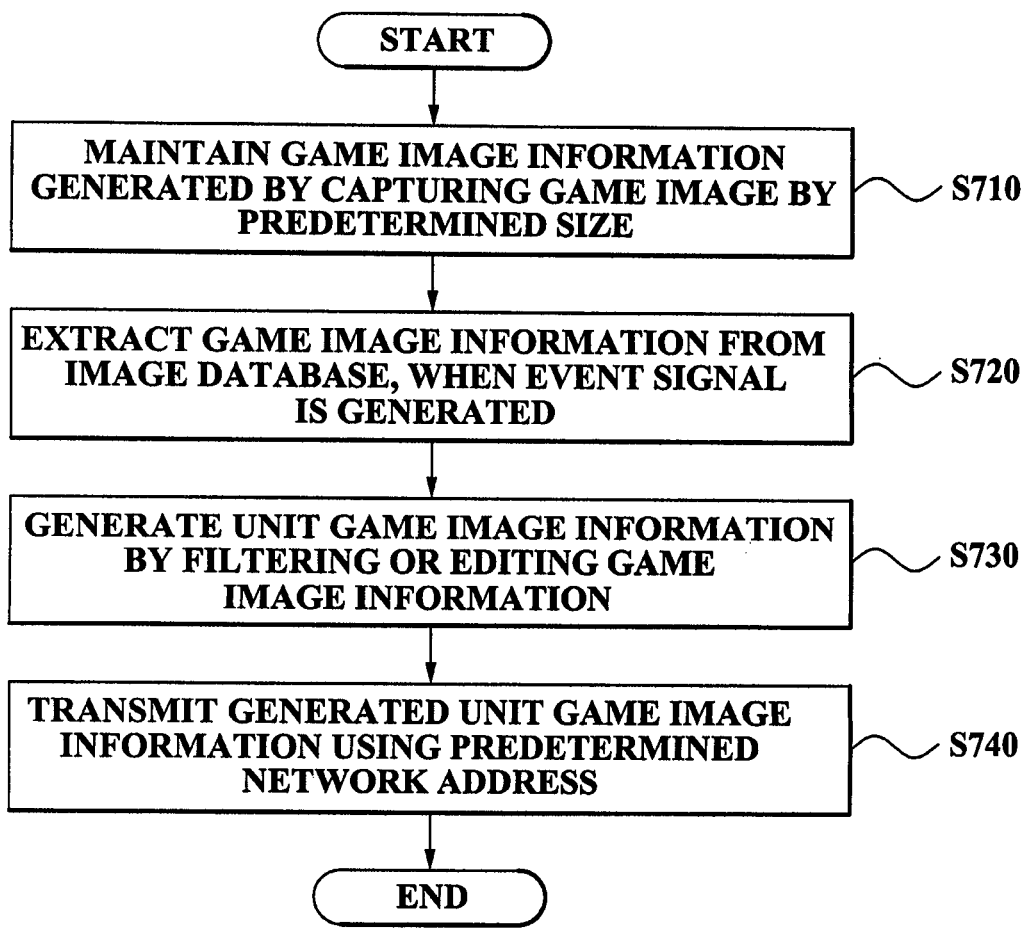
FIG. 7 is a flowchart illustrating an example of a game scrapbook method according to another embodiment of the present invention.

FIG. 7 is a flowchart illustrating an example of a game scrapbook method according to another embodiment of the present invention. The game scrapbook method according to the present embodiment may be performed by the game scrapbook system 400.

In step S710, the game scrapbook system 400 generates and maintains game image information which is associated with a game image displayed in a display of the terminal 125 according to a game progress. This step S710 is a process of capturing the game image based on the game progress time, a total capacity for maintaining information and a game stage and storing the captured game image in the image database 410 as the game image information.

In step S720, the game scrapbook system 400 extracts the game image information from the image database 410, when a predetermined event signal is generated. In step S720, the game scrapbook system 400 may generate an event signal associated with transmission of the game image, in response to a request for generating the event signal from the gamer 120, and extract the game image information from the image database 410. As described above, the game scrapbook system 400 generates the event signal with respect to a particular game image while a game is in progress, according to the gamer's 120 request. Through this, the game image which is not pre-set as setup information but is setup as the gamer 120 desires to record, may be flexibly maintained.

In step S730, the game scrapbook system 400 edits the extracted game image information into predetermined unit game image information by filtering or editing. This step S730 is a process of selecting the game image information which is most adjacent to a game environment which substantially causes an event signal to be generated. In this instance, only a game screen necessary for the game image information to be maintained in the web server may be included. Namely, in step S730, the game scrapbook system 400 divides the extracted game image information into unit game image information of a predetermined time period and extracts a predetermined number of the unit game image information which is temporally adjacent to a generation point in time of the event signal. Also, the game scrapbook system 400 segments the unit game image information into at least one cell and extracts a predetermined number of cells which are adjacent to a predetermined object (a character, an element, etc., to be recorded).

In step S740, the game scrapbook system 400 transmits the unit game image information using the predetermined network address. This step S740 is a process of maintaining the selected unit game image information in the remote location (web server) in the network designated by the gamer 120.

As described above, according to the present invention, a predetermined size of the game image is stored under a predetermined condition. Also, a game image which directly causes an event signal to be generated together with a generation of the event signal about game transmission, is selected. Accordingly, although the generation of the event signal is not accurate, the game image to be recorded may be accurately retrieved, recorded and maintained.

The image scrapbook system and method according to the above-described embodiment of the present invention may be recorded in computer-readable media including program instructions to implement various operations embodied by a computer. The media may also include, alone or in combination with the program instructions, data files, data structures, and the like. Examples of computer-readable media include magnetic media such as hard disks, floppy disks, and magnetic tape; optical media such as CD ROM disks and DVD; magneto-optical media such as optical disks; and hardware devices that are specially configured to store and perform program instructions, such as read-only memory (ROM), random access memory (RAM), flash memory, and the like. The media may also be a transmission medium such as optical or metallic lines, wave guides, etc. including a carrier wave transmitting signals specifying the program instructions, data structures, etc. Examples of program instructions include both machine code, such as produced by a compiler, and files containing higher level code that may be executed by the computer using an interpreter. The described hardware devices may be configured to act as one or more software modules in order to perform the operations of the above-described embodiments of the present invention.

Although a few embodiments of the present invention have been shown and described, the present invention is not limited to the described embodiments. Instead, it would be appreciated by those skilled in the art that changes may be made to these embodiments without departing from the principles and spirit of the invention, the scope of which is defined by the claims and their equivalents.

As used in this application, the terms "unit" or "component" are intended to refer to, but are not limited to, a software or hardware component, which performs certain tasks. A unit system or component may advantageously be configured to reside on the addressable storage medium and configured to execute on one or more processors. Thus, a unit or component may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and units may be combined into fewer components and units or further separated into additional components and units. Thus, there has been shown and described several embodiments of a novel invention. As is evident from the foregoing description, certain aspects of the present invention are not limited by the particular details of the examples illustrated herein, and it is therefore contemplated that other modifications and applications, or equivalents thereof, will occur to those skilled in the art. The terms "having" and "including" and similar terms as used in the foregoing specification are used in the sense of "optional" or "may include" and not as "required". Many changes, modifications, variations and other uses and applications of the present construction will, however, become apparent to those skilled in the art after considering the specification and the accompanying drawings. All such changes, modifications, variations and other uses and applications which do not depart from the spirit and scope of the invention are deemed to be covered by the invention which is limited only by the claims which follow. The scone of the disclosure is not intended to be limited to the embodiments shown herein, but is to be accorded the full scope consistent with the claims, wherein reference to an element in the singular is not intended to mean "one and only one" unless specifically so stated, but rather "one or more." All structural and functional equivalents to the elements of the various embodiments described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. Section 112. sixth paragraph, unless the element is expressly recited using the phrase "means for" or. in the case of a method claim. the element is recited using the phrase "step for."

INDUSTRIAL APPLICABILITY

According to the present invention, there is provided a game scrapbook system and method which can more effectively maintain and store a game image by capturing the game image while a game is in progress and automatically transmitting game image information to a web server that a gamer can easily access.

Also, according to the present invention, there is provided a game scrapbook system and method which can accurately retrieve a game image to be recorded, even when a generation point in time of an event signal is not accurate, by maintaining game image information with respect to a captured game image under a predetermined condition, and selecting the game image information which directly causes the event signal to be generated with the generation of the event signal associated with a transmission of a game, and thus, can maintain the retrieved game image.

Also, according to the present invention, there is provided a game scrapbook system and method which can divide game image information for transmission to a web server according to properties of the game image information, and also can help the gamer to quickly retrieve the game image information when a gamer retrieves the game image information.

The invention claimed is:

1. A game scrapbook system, comprising:
   an image database;
   an image processing unit configured to continuously process playing images and generate game image information from the processed playing images during continuous play of a video game by respective gamers, wherein the image processing unit is further configured to store the game image information in the image database;
   an image extraction unit configured to extract the game image information from the image database in response to detection of an event signal generated in response to occurrence of a preset condition during the continuous play of the video game, the preset condition being associated with one gamer of the respective gamers;
   an image editor configured to filter unit game image information via selecting a portion of the game image information extracted by the image extraction unit, the selected portion of the game image information being adjacent to a point in time of the event signal; and
   an image transmission unit configured to, during the continuous play of the video game, transmit the unit game image information to a remote location configured to store the unit game image information, and notify the one gamer that the unit game image information has been transmitted to the remote location.

2. The system of claim 1, wherein the image editor is further configured to:
   divide the game image information extracted by the image extraction unit into a plurality of unit playing image sessions according to a time interval; and
   generate unit game image information by selecting a number of the unit playing image sessions in response to detection of the event signal.

3. The system of claim 1, wherein the image editor is further configured to edit the game image information to display a portion of the game image information.

4. The system of claim 1, further comprising:
   a data table configured to store setup information, the setup information comprising information corresponding to the preset condition; and
   an event generation unit configured to generate the event signal in response to detection of occurrence of a game event associated with the stored setup information while the one gamer is playing the video game.

5. The system of claim 1, wherein the event signal is generated in response to detection of a request for generating the event signal from the one gamer.

6. The system of claim 1, wherein the image processing unit is configured to store the game image information based on a game progress time, a total capacity for maintaining information, a game stage, or any combination thereof.

7. The system of claim 6, wherein the image processing unit is further configured to determine a maximum capacity of the game image information that can be stored in the image database according to one of the game process time, the total capacity for maintaining information, and/or the game stage, and in response to detection of the game image information exceeding the determined maximum capacity, the image processing unit is further configured to update the game image information in the image database based on a first-in first-out method.

8. The system of claim 1, wherein:
   the image editor is further configured to edit the unit game image information; and the edited unit game image information is sorted according to a form and provided to the one gamer with the sorted unit game image information.

9. The system of claim 1, wherein:
   the unit game image information is transmitted to the remote location via a network using a network address stored in association with the present condition; and
   the network address comprises information to identify a web server associated with at least one of a blog service, a homepage service, and a community service associated with the respective gamers.

10. The system of claim 1, wherein the unit game image information is stored via the remote location according to properties of the video game.

11. A game scrap booking method using a processor, the method comprising:
continuously processing game play images with respect to respective gamers continuously playing a video game;
generating game image information from the processed game play images; storing the game image information in an image database;
extracting the game image information from the image database in response to detecting an event signal, the event signal being generated in response to occurrence of a preset condition during the continuous play of the video game, the preset condition being associated with one gamer of the respective gamers; and
filtering unit game image information via selecting a portion of the extracted game image information, the selected portion of the extracted game image information being adjacent to a point in time of the event signal;
transmitting, during the continuous play of the video game, the unit game image information to a remote location configured to store the unit game information; and
notifying the one gamer that the unit game information has been transmitted to the remote location.

12. The method of claim 11, wherein:
transmitting the unit game image information to the remote location is performed via a network using a network address; and
the network address comprises information to identify a web server associated with at least one of a blog service, a homepage service, and a community service associated with the respective gamers.

13. The method of claim 11, wherein the filtering comprises:
dividing the extracted game image information into a plurality of unit playing image sessions according to a time interval; and
selecting a number of the unit playing image sessions in response to detection of the event signal.

14. The method of claim 13, further comprising:
segmenting the selected portion of the extracted game image information into a plurality of cells; and
selecting a number of cells, from the plurality of cells, which comprise or are adjacent to a virtual object of the respective video games,
wherein the selected number of cells are utilized to generate the unit game image information.

15. A non-transitory computer readable storage medium comprising an executable program, that when executed by a processor, performs the method recited in claim 11.

16. The method of claim 11, further comprising:
editing the selected portion of the extracted game image information.

17. The method of claim 11, further comprising:
editing the selected portion of the game image information to display a portion of the game image information,
wherein a virtual area near a virtual object to be recorded is displayed.

18. The method of claim 11, wherein the unit game image information is stored via the remote location according to properties of the video game.

* * * * *